United States Patent [19]
Kleppner

[11] Patent Number: 6,073,614
[45] Date of Patent: Jun. 13, 2000

[54] FUEL-FEEDING UNIT WITH IMPROVED FUEL PUMP GEOMETRY

[75] Inventor: Stephan Kleppner, Bretten, Germany

[73] Assignee: Robert Bosch GmbH, Stuttgart, Germany

[21] Appl. No.: 09/167,385

[22] Filed: Oct. 6, 1998

[30] Foreign Application Priority Data

Dec. 4, 1997 [DE] Germany ............................ 197 53 860

[51] Int. Cl.[7] .................................................. F02M 37/04
[52] U.S. Cl. ............................................ 123/509; 123/510
[58] Field of Search .................................... 123/509, 510, 123/514, 516, 497; 137/565, 576, 572, 574

[56] References Cited

U.S. PATENT DOCUMENTS

| | | | |
|---|---|---|---|
| 4,672,937 | 6/1987 | Fales | 123/516 |
| 4,869,225 | 9/1989 | Nagata | 123/516 |
| 5,038,741 | 8/1991 | Tuckey | 123/509 |
| 5,046,471 | 9/1991 | Schmid | 123/510 |
| 5,392,750 | 2/1995 | Laue | 123/509 |
| 5,699,773 | 12/1997 | Kleppner | 123/510 |
| 5,797,376 | 8/1998 | Frank | 123/509 |
| 5,875,816 | 3/1999 | Frank | 123/510 |

FOREIGN PATENT DOCUMENTS 44 44 854 A1  6/1996  Germany .

*Primary Examiner*—Carl S. Miller
*Attorney, Agent, or Firm*—Michael J. Striker

[57] ABSTRACT

A fuel-feeding unit for supplying a fuel from a fuel tank is described which has a particularly compact structure. The described fuel-feeding unit has a fuel pump driven by an electrical motor, a low pressure side preliminary fuel filter and a high pressure side main fuel filter arranged in a housing. The housing has a central compartment for the electrical motor and a circular compartment surrounding the central compartment in which the main fuel filter is located. The housing is closed and sealed by means of a housing cover that has a fuel outlet connector and an E-connector for electrical power lines. The pump impeller of the fuel pump arranged in a pump compartment inside the housing has a diameter which is larger than the diameter of the central compartment and the fuel is fed from the fuel pump directly into the circular compartment.

9 Claims, 2 Drawing Sheets

FUEL-FEEDING UNIT WITH IMPROVED FUEL PUMP GEOMETRY

BACKGROUND OF THE INVENTION

1. Field of the Invention

The present invention relates to a fuel-feeding unit and, more particularly, to a fuel-feeding unit with improved fuel pump geometry.

2. Prior Art

A fuel-feeding unit is described in German Patent Document DE 44 44 854 A1 for supplying fuel from a fuel tank, which has a fuel pump driven by an electric motor, a preliminary fuel filter arranged upstream of the fuel pump and a main fuel filter arranged downstream of the fuel pump, which are located in a filter container. The filter container is closed with a filter cover. The fuel pump and the electric motor are held in a central compartment in the filter container as a separate component. The main fuel filter is arranged in a ring compartment that is concentric to the central compartment. The electric motor is pressed by means of a special supporting member against the fuel pump so that the fuel pump and the electric motor are held axially without play in the filter container. Since the fuel pump is located in the central compartment, the electric motor and the fuel pump are formed as separate components and the fuel pump has a comparatively high rotation speed because of the its limited size. Because of that the efficiency remains limited and the comparatively high rotation speed causes the occurrence of a correspondingly high sound emission.

SUMMARY OF THE INVENTION

It is an object of the present invention to provide a fuel-feeding unit of the above-described type that does not have the above-described disadvantages or that suffers less from those disadvantages.

The fuel-feeding unit according to the invention that operates to supply a fuel from a fuel tank, comprises an electric motor that drives a fuel pump having a pump impeller, a preliminary fuel filter on the low pressure side of the fuel pump and a main fuel filter on the high pressure side. These components are integrated in a single housing. The housing has a central compartment in which the electric motor is located and a circular compartment surrounding the central compartment in which the main fuel filter is located. The housing is closed tightly by means of a cover. The cover has a fuel outlet connector, through which clean fuel fed through the fuel-feeding unit according to the invention is supplied, for example to an internal combustion engine of a vehicle, and an E-connector for electrical power lines. The fuel pump is arranged in a pump compartment inside the housing and has a pump impeller that has a diameter that is larger than the diameter of the central compartment. The fuel is supplied directly into the circular compartment by the fuel pump.

The number of parts is reduced since the device is an integrated single unit which is a substantial advantage for the fuel-feeding unit according to the invention. The improved pump geometry, i.e. the increased diameter of the pump impeller, is an additional substantial advantage. The length of the channels present in the pump impeller along which the pressure increases is increased in the enlarged fuel pump of the invention. This leads to an increased efficiency of the fuel pump. Also this leads to a reduction of the fuel pump rotation speed with the improved efficiency and increase in diameter of the pump impeller, assuming the same consumed power. A reduction of the pump impeller speed of the fuel pump causes the sound emission, which comes from the fuel pump, to be greatly reduced. The fuel-feeding aggregate or unit according to the invention thus is simpler and more compact in structure than the known unit.

According to one preferred embodiment of the invention the diameter of the pump impeller is substantially equal to the outer dimension of the housing. Preferably the housing is formed as a cylindrical housing, so that the outer dimension of the pump-receiving compartment, in which the pump impeller of the fuel pump is mounted, is substantially the same or in agreement with the outer diameter of the housing. Because of that, a particularly compact fuel feed unit results whose dimension-related efficiencies are maximized.

According to another preferred embodiment of the invention the fuel pump is arranged so that the fuel flow occurs directly from the fuel pump into the facing side of the circular compartment. That means that the fuel pump is arranged on the side remote from the housing cover of the fuel-feeding unit substantially facing it. Because of that an extremely short flow path results, since the fuel fed by the fuel pump can be fed directly to the main fuel filter from the outlet of the fuel pump for its principal cleaning. A fuel feed via the central compartment into the circular compartment, as is common in the fuel-feeding unit according to the state of the art, does not occur. This also contributes to the advantageous features, so that the required power the fuel pump consumes can be reduced and an additional reduction of the rotation speed is possible at a given power.

Advantageously the drive shaft of the electrical motor on which its armature is found passes through the chamber in which the pump is located and is supported on the housing. Because of that no dirt reaches the clean side of the fuel-feeding unit.

According to an additional preferred embodiment the fuel pump has a cover plate on the low pressure side, which is held on the housing by the preliminary fuel filter, which for its part surrounds a lower part of the housing and engages the peripheral edge of the housing there. Because the edge of the cover plate is connected with the housing in a form-fitting manner, a sufficient seal is guaranteed. An additional advantage results when only the housing cover, which has the outer connection and the E-connector, is connected with the housing. Preferably this occurs by welding.

Advantageously the circular compartment, in which the main fuel filter is located, is divided into an outer compartment region and an inner compartment region by seals. The seals are preferably O-ring seals when the fuel-feeding unit according to the invention has a substantial cylindrical form.

According to an additional preferred embodiment of the invention the seals in the circular compartment are advantageously arranged or divide the circular compartment in such a way that the fuel flow occurs from the fuel pump next into the outer compartment region and from there from the main fuel filter into and through the inner compartment region. Then the fuel flow again occurs from the inner compartment region via the fuel outlet connection again the fuel-feeding unit. Thus an effective flow through the fuel-feeding unit can be accomplished with the filter arranged interiorly so that a short flow path is guaranteed. According to an additional embodiment at least one elastic connecting element is provided for support of the fuel tank in the housing in the fuel-feeding unit.

According to still another embodiment the fuel pump and the electric motor are integrated in the housing, whereby the pump compartment is separated from the central compartment and the circular compartment on the side facing the electric motor by means of a wall, which is part of the housing. Also because of that the number of components is reduced.

Thus the fuel-feeding unit according to the invention is economical and results in a compact tank structural unit.

BRIEF DESCRIPTION OF THE DRAWINGS

The objects, features and advantages of the invention will now be illustrated in more detail with the aid of the following description of the preferred embodiments, with reference to the accompanying figures, in which.

DESCRIPTION OF THE PREFERRED EMBODIMENTS

Figure 1:
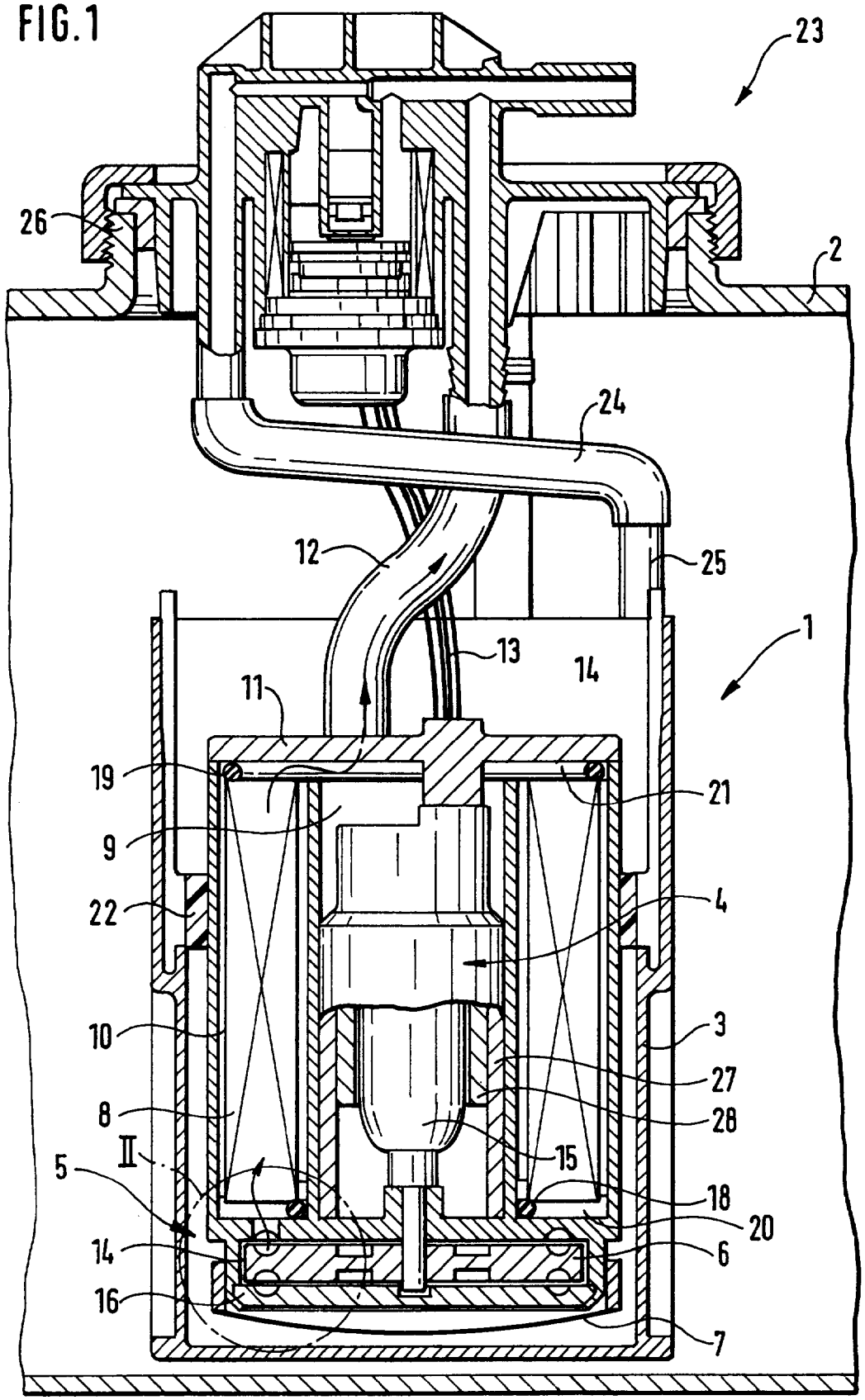
FIG. 1 is a cross-sectional view of a fuel-feeding unit according to the invention.

A fuel-feeding unit 1 is shown in FIG. 1, which is mounted in a fuel tank 2. The fuel-feeding unit 1 according to the invention is attached to or mounted on a tank flange by means of a tank insert closure or tank cap 23 with suitable connecting ducts or lines. The fuel-feeding unit 1 has an electric motor 4 in its housing 3, which is arranged in a central compartment 9, and which comprises a stator 27 with a suitable magnet 28 and an armature 15 that is mounted on a drive shaft S of the electric motor 4. The drive shaft passes through a pump compartment 14 and is supported in the housing 3 by means of a cover plate 16.

Furthermore a fuel pump 5 is arranged on the end closest to or facing the tank base. The fuel pump 5 has a pump impeller 6 in its interior whose diameter substantially corresponds to the outer diameter of the cylindrical housing 3. By rotatably driving the pump impeller 6 in the pump compartment 14 with the electric motor 4 fuel is pumped through a preliminary fuel filter 7 and through an opening provided in the cover plate 16 via the pump radial channels until it reaches the high pressure outlet opening of the fuel pump 5. This high pressure outlet opening is overflow opening 29. It is next to or adjacent to the pump radial channels so that the supplied fuel is fed over an extremely short flow path directly to the outer compartment region 20 of the circular compartment 10 formed by the seals 18,19 immediately on the high pressure side of the fuel pump 5. The main fuel filter 8 is of course located in the circular compartment 10. The fuel flow fed into the outer compartment region 20 passes through the main fuel filter 8 to the inner compartment region 21 of the circular compartment 10. The fuel flows from the inner compartment region 21 via the fuel outlet connector 12 which is in the cover 11 of the fuel-feeding unit 1 and is part of the housing 3, into a fuel line or duct provided in or on the tank insert closure or tank cap 23, through which the required fuel is supplied, for example to an internal combustion engine of a vehicle.

The single fuel-feeding unit 1 is supported by means of at least one elastic mounting member or element 22 in the fuel tank 2, so that vibrations of the fuel-feeding unit necessarily occurring because of the operation of the electric motor 4 are not transmitted to the tank. It is also possible however that the fuel-feeding unit is located in a container, which is introduced as a whole into the tank of the vehicle. The elastic mounting element is then located between the housing 3 and the interior of the container. A dip tube 25 is provided either on the tank inner wall or on the inner side of the container of this type for feeding load-dependent unburned fuel to the fuel tank. This unburned fuel is fed to the dip tube 25 through a fuel return tube 24, similarly integrated in the tank insert closure or cap 23. Thus the returned fuel is filtered again in the preliminary fuel filter 7 and the main fuel filter 8 of the fuel-feeding unit 1.

Figure 2:
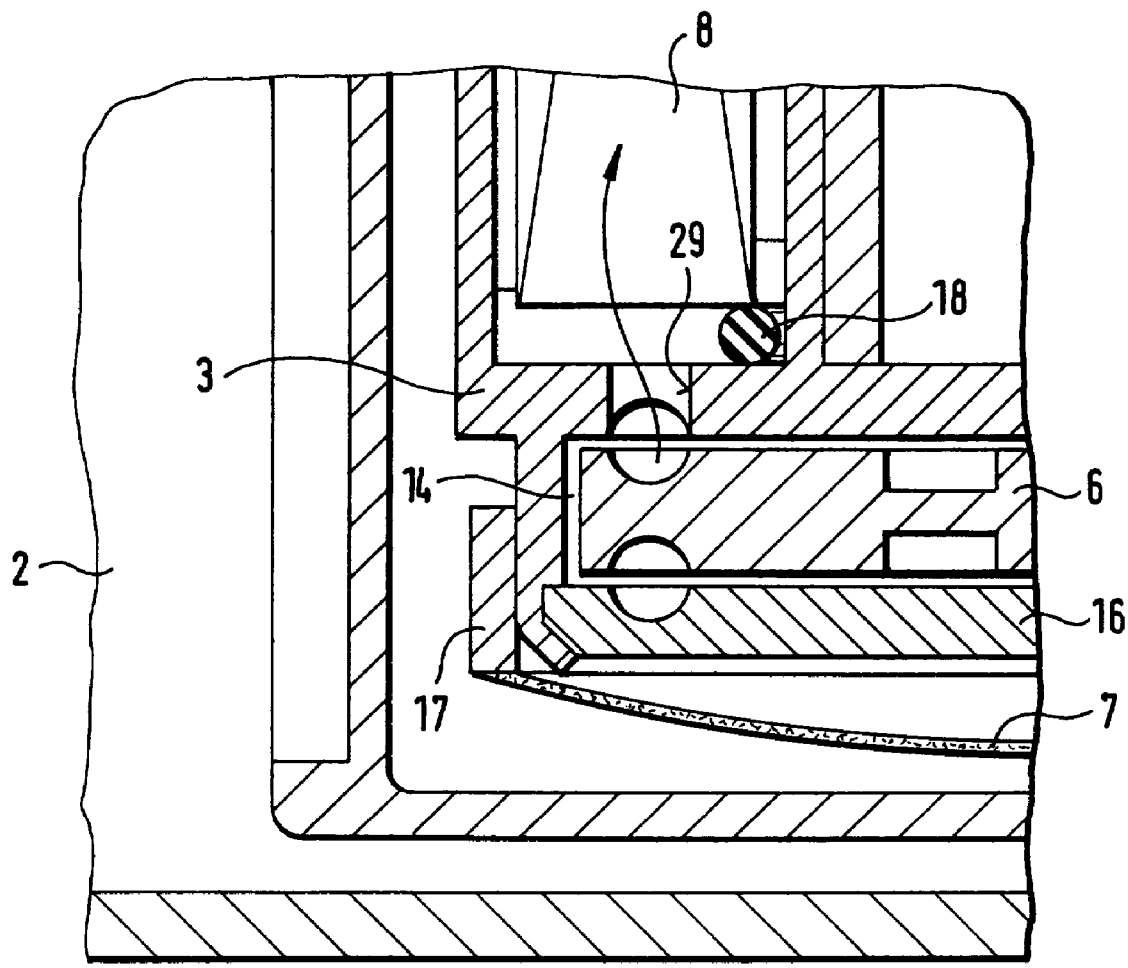
FIG. 2 is a detailed cutaway cross-sectional view of a portion of the fuel-feeding unit shown in FIG. 1, in which the direct feed of the fuel pumped through the fuel pump to the main fuel filter is clearly shown.

A detailed cross-section of a part of the region of the fuel-feeding unit 1 in which the fuel pump 5 is arranged is shown in FIG. 2. The electric motor 4, whose stator 27 is shown in FIG. 1, the main fuel filter 8 located in the circular compartment 10 and the fuel pump 5 arranged with the pump impeller 6 in the pump compartment 14 are accommodated in the housing 3. The circular compartment 10 is divided into an outer compartment region 20 and an inner compartment region 21 by means of the seal 18. The pump impeller 6 has a diameter, which is almost as large as the outer diameter of the housing 3. The fuel fed by the feed pump 5 from the pump channels of the pump impeller 6 is directly fed into the outer compartment region 20 of the circular compartment 10 via the overflow opening 29. This is indicated by the arrow in FIG. 2.

On the end closest to the preliminary fuel filter 7 the pump impeller 6 of the fuel pump 5 or pump compartment 14 is closed by the cover plate 16, whose edge region is received by the housing 3 and forms a single unit with it. The preliminary fuel filter 7 has a right-angled edge portion or flange 17, whose inner diameter fits or is nearly equal to the outer diameter of the housing 3 in the vicinity of the fuel pump 5 so that the edge of the preliminary fuel filter 7 is pressed into the housing to form a seal with the housing. A press fit of this type can, for example, be provided by a shrink fit.

With the arrangement of the fuel pump 5 in relation to the housing 3 according to the invention the diameter of the pump impeller 6 of the fuel pump can be increased so that the efficiency is increased because the length of the pump channels is increased. Because of that the feed path of the fuel, which leaves the high pressure side of the pump can be reduced by the direct overflow through the overflow opening 29 into the circular compartment 10 in which the main fuel filter 8 is located.

The "high pressure" side of the fuel pump means the downstream side of the fuel pump, i.e. downstream of the impeller, and the "low pressure" side means the upstream side of the fuel pump, i.e. upstream of the impeller.

The disclosure in German Patent Application 197 53 860.6-13 of Dec. 4, 1997 is incorporated here by reference. This German Patent Application describes the invention described hereinabove and claimed in the claims appended hereininbelow and provides the basis for a claim of priority for the instant invention under 35 U.S.C. 119.

While the invention has been illustrated and described as embodied in a fuel-feeding unit with improved fuel pump geometry, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A fuel-feeding unit (1) for supplying a fuel from a fuel tank (2), said fuel-feeding unit comprising a housing (3) provided with a housing cover (11) to seal the housing (3) and said housing cover (11) has a fuel outlet connector (12) and an E-connector (13) for electrical power lines, a fuel pump (5) in the housing (3) and having a pump impeller (6), an electric motor (4) in the housing (3) connected to the fuel pump (5) to drive the pump impeller (6), a preliminary fuel filter (7) in the housing (3) on a low pressure side of the fuel pump (5), and a main fuel filter (8) in the housing on a high pressure side of the fuel pump;

wherein the housing (3) is provided with a central compartment (9) in which the electric motor (4) is located, a pump compartment (14) for the pump impeller (6) of the fuel pump (5) and a circular compartment (10) in which the main fuel filter (8) is located, and the central compartment (9) is surrounded by the circular compartment (10); and wherein the pump impeller (6) has a diameter that is larger than a diameter of the central compartment (9) and the fuel pump (5) is provided with means for feeding the fuel directly into the circular compartment (10).

2. The fuel-feeding unit as defined in claim 1, wherein said diameter of said pump impeller (6) is substantially equal to an outer diameter of said housing (3).

3. The fuel-feeding unit as defined in claim 1, wherein the fuel pump (5) is arranged adjacent to and facing the circular compartment (10) so that the fuel is fed directly from the fuel pump (5) into the circular compartment (10).

4. The fuel-feeding unit as defined in claim 1, wherein the electric motor (4) has an armature (15) including a shaft (S), said shaft (S) passes through the pump compartment (14) and said shaft (S) is supported on the housing (3).

5. The fuel-feeding unit as defined in claim 1, wherein the fuel pump (5) has a cover plate (16) arranged on the low-pressure side of the fuel pump (5), the preliminary fuel filter (7) includes means for holding the cover plate (16) on the housing (3) and engages circumferentially around the housing (3) with a peripheral edge (17) thereof.

6. The fuel-feeding unit as defined in claim 1, wherein the circular compartment is divided by seals (18,19) into an outer compartment region (20) and an inner compartment region (21).

7. The fuel-feeding unit as defined in claim 6, wherein the seals (18,19) arranged in the circular compartment (10) are arranged so that the fuel issues from the fuel pump (5) into the outer compartment region (20), flows through the main fuel filter (8) and flows out from the inner compartment region (21) via the fuel outlet connector (12).

8. The fuel-feeding unit as defined in claim 1, wherein the housing (3) is provided with at least one elastic mounting element (22) for support on a wall of the fuel tank (2).

9. The fuel-feeding unit as defined in claim 1, wherein the fuel pump (5) and the electric motor are integrated in the housing (3), and the pump compartment (14) is divided into a central compartment (9) and a circular compartment (10) by means of a wall forming a part of the housing (3).

* * * * *